US012580939B2

(12) United States Patent
Herzberg et al.

(10) Patent No.: US 12,580,939 B2
(45) Date of Patent: **\*Mar. 17, 2026**

(54) TECHNIQUES FOR AGENTLESS DETECTION OF SENSITIVE DATA ON MANAGED DATABASES

(71) Applicant: Wiz, Inc., New York, NY (US)

(72) Inventors: Raaz Herzberg, Tel Aviv (IL); Avi Tal Lichtenstein, Tel Aviv (IL); Roy Reznik, Tel Aviv (IL); Ami Luttwak, Binyamina (IL); Moran Cohen, Tel Aviv (IL); Yaniv Shaked, Tel Aviv (IL); Yinon Costica, Tel Aviv (IL); George Pisha, Giv'atayim (IL)

(73) Assignee: Wiz, Inc., New York, NY (US)

( \* ) Notice: Subject to any disclaimer, the term of this patent is extended or adjusted under 35 U.S.C. 154(b) by 119 days.

This patent is subject to a terminal disclaimer.

(21) Appl. No.: 18/049,102

(22) Filed: Oct. 24, 2022

(65) Prior Publication Data

US 2024/0104235 A1     Mar. 28, 2024

Related U.S. Application Data

(60) Provisional application No. 63/377,396, filed on Sep. 28, 2022.

(51) Int. Cl.
*H04L 9/40*        (2022.01)
*G06F 9/455*       (2018.01)
        (Continued)

(52) U.S. Cl.
CPC ...... *H04L 63/1433* (2013.01); *G06F 9/45558* (2013.01); *G06F 16/211* (2019.01); *G06F 16/355* (2019.01); *G06F 16/9024* (2019.01);

*G06F 16/906* (2019.01); *G06F 16/95* (2019.01); *G06F 21/577* (2013.01);
        (Continued)

(58) Field of Classification Search
CPC .............. H04L 63/1433; H04L 63/104; G06F 9/45558; G06F 16/211; G06F 16/355; G06F 16/9024; G06F 16/906; G06F 16/95; G06F 21/577; G06F 21/6218; G06F 21/6245; G06F 2009/4557; G06F 2009/45587
See application file for complete search history.

(56) References Cited

U.S. PATENT DOCUMENTS 9,330,273 B2    5/2016   Khetawat et al.
10,803,188 B1   10/2020  Rajput et al.
        (Continued)

*Primary Examiner* — Cheng-Feng Huang
(74) *Attorney, Agent, or Firm* — M&B IP Analysts, LLC

(57)        ABSTRACT

A system and method for agentless detection of sensitive data in a cloud computing environment includes generating a snapshot from a managed database service, the snapshot including a plurality of data files stored in a bucket on a cloud computing environment; deploying a virtual instance based on the snapshot to generate a database, the database including a database management system (DBMS); querying the DBMS to fetch data from the database; classifying the fetched data, wherein the fetched data is classified as sensitive data or non-sensitive data; and generating a node on a security graph stored in a graph database to represent the fetched data and the classification thereof, wherein the security graph includes a representation of the cloud computing environment.

20 Claims, 8 Drawing Sheets

(51) Int. Cl.

| | |
|---|---|
| *G06F 16/21* | (2019.01) |
| *G06F 16/355* | (2025.01) |
| *G06F 16/901* | (2019.01) |
| *G06F 16/906* | (2019.01) |
| *G06F 16/95* | (2019.01) |
| *G06F 21/57* | (2013.01) |
| *G06F 21/62* | (2013.01) |

(52) U.S. Cl.
CPC ........ *G06F 21/6218* (2013.01); *H04L 63/104* (2013.01); *G06F 2009/4557* (2013.01); *G06F 2009/45587* (2013.01); *G06F 21/6245* (2013.01)

(56)                    References Cited

U.S. PATENT DOCUMENTS

| | | | |
|---|---|---|---|
| 11,388,183 B2 | 7/2022 | Hoopes et al. | |
| 2021/0216630 A1* | 7/2021 | Karr | H04L 63/1416 |
| 2023/0087093 A1* | 3/2023 | Ithal | H04L 63/1416 726/7 |

* cited by examiner

300

TECHNIQUES FOR AGENTLESS DETECTION OF SENSITIVE DATA ON MANAGED DATABASES

CROSS-REFERENCE TO RELATED APPLICATIONS

This application claims the benefit of U.S. Provisional Application No. 63/377,396 filed on Sep. 28, 2022, the contents of which are hereby incorporated by reference.

TECHNICAL FIELD

The present disclosure relates generally to cybersecurity, and specifically to detecting sensitive data in a computing environment which is potentially exposed, and alerting of the same.

BACKGROUND

Many advantages of modern life are possible thanks to solutions provided by various computer related industries. Travel relies on booking software, cross-country and cross-continent accounting is possible due to software solutions, e-commerce allows people to organize a worldwide marketplace to purchase goods and services from anywhere to anywhere, while even national infrastructure such as water, gas, and electricity, are connected to computer networks to efficiently manage the provision of utilities.

Many of these software solutions are deployed on cloud computing infrastructure, such as provided by Amazon® Web Services (AWS), Google® Cloud Platform (GCP), Microsoft® Azure, and the like. Some software solutions are deployed on premises (on-prem), others are deployed using hybrid cloud solutions, while others are deployed on multi-cloud platforms. This allows users and administrators of such solutions to leverage each platform's advantages. However, as these software solutions grow, i.e., provide more services, and more service types, to more users, deployment of such solutions becomes cumbersome. It is not unusual for cloud computing environments deployed on a cloud computing platform to have thousands, and tens of thousands of virtual instances, such as virtual machines, serverless functions, software containers, and the like, utilized to provide the software solution.

Some of these software solutions store sensitive data, such as credit card numbers, social security numbers, physical addresses of individuals, medical data, and more. Sensitive data can be classified as personal identifiable information (PII), personal health information (PHI), and payment card industry (PCI), to name a few examples. While rules and regulations exist to monitor use and storage of such data, such are usually jurisdiction-specific, and only add to the complexity of the software solutions which need to perform this monitoring in order to comply with the various rules and regulations.

While there are solutions which allow visibility into network elements, including types of virtual instances, services, data storages, and the like, such solutions provide an abundance of information which a human is not able to process. For example, where an administrator wishes to find a certain network element, it is not useful to show an abundance of network elements which the administrator then has to sift through. Such solutions are provide frustrating user experience, and as a result their usability, i.e., the number of interactions between a human operator and a computing system, drops significantly.

It is beneficial to provide a visualization of where sensitive data is stored and potentially exposed, as humans rely on our sense of vision more than other senses. However, over stimulating this sense results in the human operator ceasing to use the network visibility solution, and therefore leaving sensitive data potentially exposed to cybersecurity attacks.

Furthermore, an administrator does not always necessarily know where sensitive data is stored, as the data may be handled by different users, virtual instances, and the like, across multiple cloud environments. Therefore, marking a certain storage as containing sensitive data and monitoring access to said storage, is insufficient, due to the dynamic nature of cloud computing environments and their usage.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for agentless detection of sensitive data in a cloud computing environment and rendering the same for display. The method comprises: generating a snapshot from a managed database service of a cloud computing environment, the snapshot including a plurality of data files; deploying a virtual instance based on the snapshot to generate a database, the database including a database management system (DBMS); querying the DBMS to fetch data from the database; classifying the fetched data, wherein the fetched data is classified as sensitive data or non-sensitive data; and generating a node on a security graph stored in a graph database to represent the fetched data and the classification thereof, wherein the security graph includes a representation of the cloud computing environment.

Certain embodiments disclosed herein also include a non-transitory computer readable medium having stored thereon causing a processing circuitry to execute a process, the process comprising: generating a snapshot from a managed database service of a cloud computing environment, the snapshot including a plurality of data files; deploying a virtual instance based on the snapshot to generate a database, the database including a database management system (DBMS); querying the DBMS to fetch data from the database; classifying the fetched data, wherein the fetched data is classified as sensitive data or non-sensitive data; and generating a node on a security graph stored in a graph database to represent the fetched data and the classification thereof, wherein the security graph includes a representation of the cloud computing environment.

Certain embodiments disclosed herein also include a system for agentless detection of sensitive data in a cloud computing environment and rendering the same for display. The system comprises: a processing circuitry; and a memory, the memory containing instructions that, when executed by the processing circuitry, configure the system to: generate a snapshot from a managed database service of a cloud computing environment, the snapshot including a plurality of data files; deploy a virtual instance based on the snapshot to generate a database, the database including a database management system (DBMS); query the DBMS to fetch data from the database; classify the fetched data, wherein the fetched data is classified as sensitive data or non-sensitive data; and generate a node on a security graph stored in a graph database to represent the fetched data and the classification thereof, wherein the security graph includes a representation of the cloud computing environment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
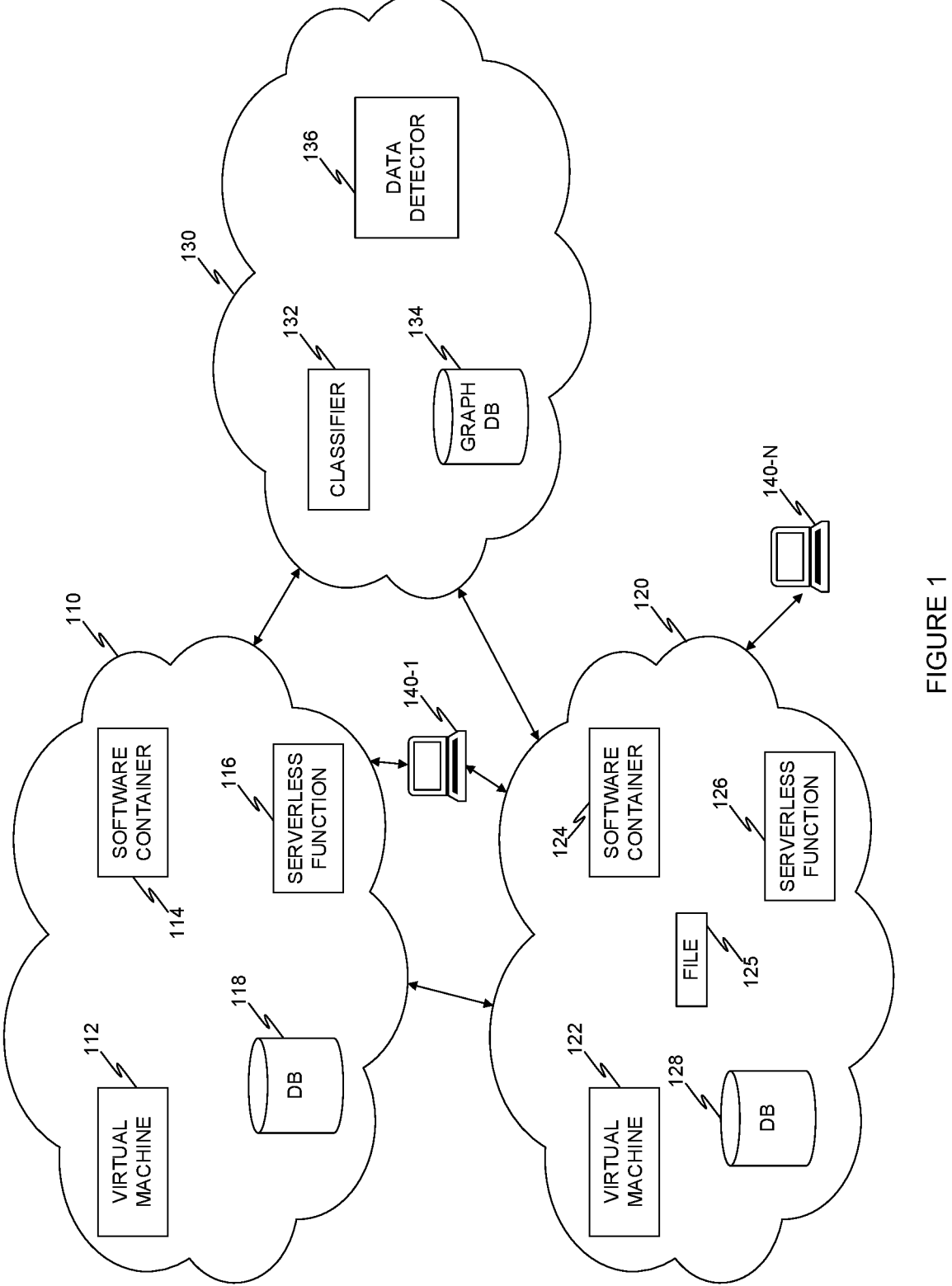
FIG. 1 is a network diagram including a cloud computing environment and an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for agentless detection of sensitive data in computing environments. In an embodiment, a computing environment is implemented on a cloud computing platform, such as Amazon® Web Services (AWS), Google® Cloud Platform (GCP), Microsoft® Azure, and the like. The computing environment is implemented, in an embodiment, as a virtual private cloud (VPC) on AWS, as a virtual network (VNet) on Azure, and the like. Sensitive data is, in an embodiment, personal identifiable information (PII), personal health information (PHI), and payment card industry (PCI). Sensitive data may be spread across multiple files, multiple different cloud computing environments, and across different workloads (e.g., storage buckets). In some embodiments, a data file is accessed to extract metadata, a data schema, a combination thereof, and the like of that file.

For example, an Apache® Parquet file is a column-oriented storage file for database tables, which has a header indicating the data schema used when generating the file. A data schema includes rules according to which data is written to a database, providing a structure for storing the data. For example, the schema of a columnar-oriented database includes the name of each column of each table of the database. In an embodiment a node is generated in a security graph to represent the data schema. In certain embodiments the security graph is stored on a graph database, such as Neo4j®, and includes a representation of a cloud computing environment.

Cloud entities of the cloud computing environment may be represented as nodes in the security graph. A cloud entity is, in an embodiment, a resource, a principal, an the like. A resource is a cloud entity which provides a service, access to computer hardware, or a combination thereof, and may be, for example, a virtual machine, a software container, a serverless function, an application, an appliance, a web server, a gateway, a load balancer, a storage bucket, and the like.

In an embodiment, a principal is a cloud entity which is authorized to initiate an action in the cloud computing environment, act on a resource, a combination thereof, and the like. A principal may be, for example, a user account, a service account, a role, and the like.

In some embodiments, a check is performed to determine if the detected data schema matches a cluster. A cluster is a node which represents a plurality of data files, to indicate that the plurality of data files represents a single data entity. For example, a columnar database may be stored as a plurality of parquet files, each file a part of the whole. When viewed as network elements, each file is separate, but since they share a data schema, the files can be associated with a cluster, which represents the database as a whole.

In certain embodiments, the data is further classified to ascertain what type of data is stored in the data file. In some embodiments, data is classified into sensitive data and non-sensitive data. In certain embodiments, sensitive data is further classified into PII, PHI, PCI, and the like. Classification is performed, in an embodiment, by reading the data and comparing the data to predetermined formats. For example, data may be read from a file, and compared with a predetermined data format. Comparing may include, in an embodiment, parsing the data to search for specific characters. For example, data may be parsed to detect an "@" symbol, which indicates that the data is an email address. In some embodiments, the comparison includes detecting metadata to reduce a number of predetermined data formats.

For example, if metadata of a column indicates "address", the predetermined data formats may be email address, physical address, and IP address. In an embodiment a predetermined data format includes a rule which is applied to the read data to determine what the data is. For example, applying a rule may include an instruction to search the data for an "@" symbol, search the data for a series of four numbers separated by a ".", search the data for "RD", "AVE", BLVD", "LN", and the like, each of which is indicative of a different type of address.

In an embodiment, a visualization is generated based on the generated cluster node. In certain embodiments, the visualization is generated in response to receiving a request from a user account, administrator account, and the like, to view where sensitive data is stored. In some embodiments, the security graph may be queried to detect sensitive data and an output of the query is used to generate the visualization. For example, the security graph is queried to detect sensitive data of PII type. In an embodiment the output includes a plurality of nodes, each representing a data file. In some embodiments the output may be further modified by querying the security graph to detect a cluster node connected to the plurality of nodes.

By generating a visualization based on the cluster node to indicate the presence of a sensitive data in the computing environment, there is no need to render a plurality of nodes, each representing the data files associated with the cluster. Therefore, compute resources are conserved, by reducing the amount of information which needs to be rendered for display. In some embodiments, the output is further modified to detect a node representing a resource associated with the data file. A resource associated with the data file may be, for example, a storage bucket. As another example, a resource may be a virtual machine on which a database management system (DBMS) is deployed which writes the data file, for example to a storage bucket, or other data repository.

In certain embodiments, the generated visualization allows reduction of repetitive user interactions with the visualization. For example, generating an interactive visualization allows a user to click on a visualization representing, for example, a data file, and rendering in response to the interaction additional information about the data file. The additional information may include, for example, the data schema. The user may repeat this for each data file, to determine which data files comprise together a single database, such as in the example of the parquet files discussed above. By displaying a cluster node as part of the rendered visualization, this repetitive interaction is reduced. Each such interaction is a form of querying, and by reducing these queries, less processor and memory resources need to be utilized, thereby providing an additional benefit.

FIG. 1 is an example of a network diagram including a cloud computing environment and an inspection environment, implemented in accordance with an embodiment. A production cloud computing environment 110 includes a plurality of resources, principals, and the like. Resources may be, for example, virtual instances such as virtual machine 112, software container 114, and serverless function 116. Resources may be, as another example, applications, such as database application 118. A virtual machine 112 may be implemented for example as an Oracle® VirtualBox®. A software container 114 may be implemented, for example, utilizing a Docker® engine, a Kubernetes® engine, and the like. A serverless function 116 may be implemented, for example, as an Amazon® Lambda function.

In an embodiment, the database 118 includes structured data, unstructured data, a combination thereof, and the like. Structured data may be, for example, a SQL database, a NoSQL database, and the like. A SQL database may be, for example, a MySQL® database, a MongoDB® database, a Redis® database, and the like. A NoSQL database may be, for example, an Apache® Ignite database, an Apache Graph database, a Neo4j® database, an Amazon DynamoDB database, an Azure Cosmos DB database, a Google Cloud Datastore, and the like. Unstructured data may be, for example files, folders, and the like, such as JSON files, XML files, and the like.

A production cloud computing environment 110, also referred to as "production environment 110" and "cloud computing environment 110", is a cloud computing environment where user-ready software is deployed and executed. Software development often includes a development environment, a testing environment, a staging environment, and a production environment. This allows software engineers to ensure that code performs as expected, appliances, virtualizations, and the like, all perform according to set expectations, prior to being deployed in a production environment. This is done in order to prevent obstruction in the production environment, for example by introducing malfunctioning code. In an embodiment, the production environment 110 is implemented using a VPC on a cloud computing platform such as AWS. In some embodiments, the production environment 110 includes a plurality of cloud computing environments, each implemented on a different cloud computing platform. For example, the production environment 110 includes, in an embodiment, a first cloud computing environment implemented on AWS and a second cloud computing environment implemented on GCP.

The production environment 110 is communicatively coupled with a development cloud computing environment 120, also referred to as dev environment 120 and cloud computing environment 120. In an embodiment, the dev environment 120 is implemented utilizing a VPC on a cloud computing platform such as AWS. In some embodiments, the dev environment 120 includes a plurality of cloud computing environments, each implemented on a different cloud computing platform. For example, the dev environment 120 includes, in an embodiment, a first cloud computing environment implemented on GCP and a second cloud computing environment implemented on AWS.

The dev environment 120 includes a virtual machine 122 which is a counterpart to the virtual machine 112 of the production environment 110, a software container 124 which is a counterpart to the software container 114 of the production environment 110, a serverless function 126 which is a counterpart to the serverless function 116 of the production environment 110, a database 128 which is a counterpart to the database 118 of the production environment 110, and a data file 125.

In an embodiment, the data file 125 is a structured data file, such as an Apache® Parquet file, an Apache ORC file, an Apache Avro file, and the like. In some embodiments, the data file 125 includes a data schema, metadata, a combination thereof, and the like. For example, a data schema, metadata, and the like, can be stored in a header (not shown) of the data file 125.

The dev environment 120 is accessible, for example through an external network (not shown) which provides access to user devices 140-1 through 140-N, individually referred to as user device 140 and generally as user devices 140, where 'N' is an integer having a value of '1' or more. A user account associated with a user device 140 may initiate actions in the dev environment 120. For example, the user account may initiate deployment of a virtual machine, initiate the generation of the file 125 (for example by downloading a file from a database and storing it in the dev environment 120), and the like. In an embodiment, a user device is any one of: a laptop, a personal computer, a server, a tablet, and the like.

Certain user accounts and user devices 140, such as user device 140-1 are configured to access the production environment 110 and the dev environment 120. This may lead to contamination of the dev environment 120, for example by a user transferring files from the production environment 110 to the dev environment 120. For example, a user of user device 140-1 may generate a file by accessing a bucket into which database 118 writes sensitive data, such as PII. The user device 140-1 downloads the file to the user device, which may occur for example during testing. Downloading files is often permissible as such files can be utilized for testing purposes (e.g., checking that code processes information correctly), but the files are then not deleted. A user may then inadvertently copy the sensitive data, for example as file 125, to the dev environment 120. A dev environment 120 may have less cybersecurity restrictions in place, which can lead to larger unintentional exposure of sensitive data.

The dev environment 120 and production environment 110 are communicatively coupled with an inspection environment 130. In certain embodiments, the inspection environment 130 is deployed as cloud computing environment on a cloud computing platform, such as a VNet on Azure. In an embodiment, the inspection environment 130 includes a classifier 132, a graph database 134, and a data detector 136.

A classifier 132 is implemented, in an embodiment, as a workload in a cloud computing environment, such as a virtual machine, software container, serverless function, a combination thereof, and the like. In certain embodiments, the classifier 132 is configured to read data, for example from data file 125, and perform classification on the data to determine if the data is sensitive data or non-sensitive data. In certain embodiments, the classifier 132 is configured to determine if the sensitive data is any one of: PII, PHI, PCI, a combination thereof, and the like.

In an embodiment a classifier 132 is configured to utilize various classification techniques, individually or in combination, such as linear classifiers, quadratic classifiers, decision trees, neural networks, machine learning, and the like. In some embodiments, the classifier 132 is configured to perform natural language processing (NLP) techniques on data, such as Word2Vec. This may be beneficial to determine a distance between, for example, a column name (such as "ccard") and a predefined term (such as "credit card"), where the predefined term is associated with a data type.

For example, the classifier 132 is configured, in an embodiment, to read a data file, read metadata stored in the data file, and read a data schema stored in the data file. In an embodiment the classifier 132 is further configured to perform classification, NLP, a combination thereof, and the like, on any one of: the data, the metadata, and the data schema.

A graph database 134 is configured to store thereon a security graph. An example of a security graph is discussed in more detail in FIG. 4 below. In an embodiment, a security graph includes a representation of a cloud computing environment, such as the production environment 110, the dev environment 120, a combination thereof, and the like. The security graph includes a plurality of nodes. In an embodiment, a node represents a resource, a principal, an enrichment, and the like. For example, the virtual machine 112 may be represented by a first node in the security graph, and the corresponding virtual machine 122 may be represented by a second node in the security graph, which is connected, for example by an edge, to the first node, to indicate that the virtual machine 122 corresponds to the virtual machine 112.

In certain embodiments, a cloud computing environment is represented in the security graph based on a predefined data schema. For example, a data structure may be predefined for a resource, and another data structure may be predefined for a principal. In some embodiments, the predefined data structure for a resource includes a data field which indicates if the resource has stored thereon, has access to, or may otherwise obtain, sensitive data. The data field is implemented, in an embodiment, as a flag, having binary options.

In some embodiments, a data detector 136 is configured to receive a plurality of data files, and determine for example based on an extracted data schema, if the data files are associated with a single data schema. In an embodiment, the data detector 136 is configured to extract a data schema from a data file 125. For example, a data schema of a parquet file may be read by accessing the parquet file and reading the header. In certain embodiments, the data detector 136 is configured to generate an instruction, which when executed by the graph database 134, configures the graph database 134 to generate a node in the security graph which represents a data cluster. A data cluster as used herein refers to a plurality of data objects, such as data files, which are all based on a single data schema. In certain embodiments, the instruction, when executed, further configures the graph database 134 to generate a connection, for example via an edge, between the node representing the data cluster, and a node representing a data file which has a schema corresponding to the data cluster. In certain embodiment, the instruction may further configure the graph database 134 to generate a node representing the data schema.

While a production environment 110 and a dev environment 120 are discussed in this embodiment, it is readily apparent that the teachings herein apply to other environments utilized for software deployment, such as staging environments and testing environments.

Figure 2:
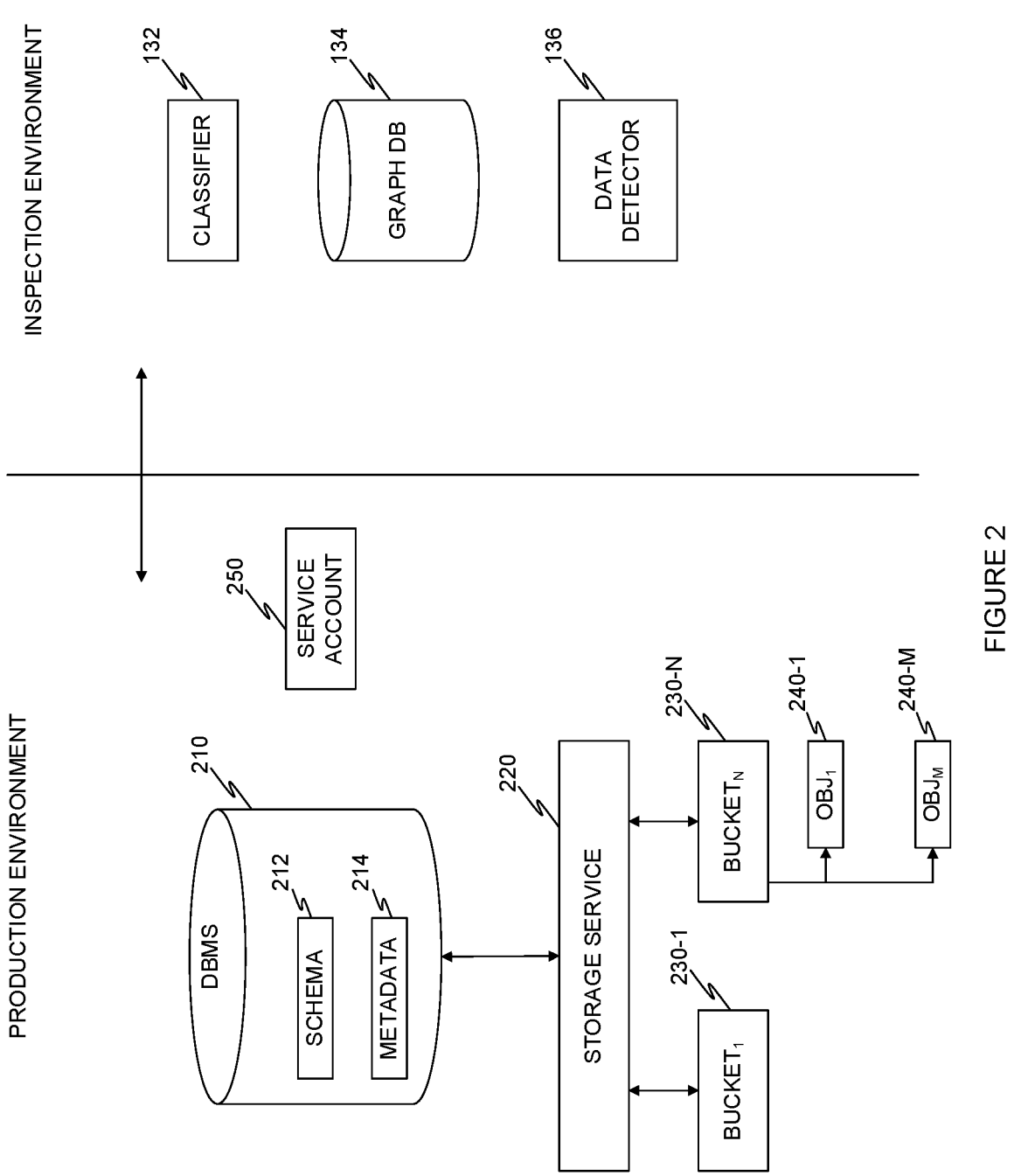
FIG. 2 is a schematic illustration of a database inspected by an inspection environment, utilized to describe an embodiment.

FIG. 2 is an example of a schematic illustration of a database inspected by an inspection environment, utilized to describe an embodiment. A database 210 is deployed in a production environment, such as the production environment 110 of FIG. 1 above. In an embodiment the database 210 is a MySQL database. The database 210 includes a database management system (DBMS) application, a data schema 212, and metadata 214. In an embodiment, the data schema 212 includes a rule which is applied to data received by the database 210 and based upon which the DBMS commits the data to the database.

In an embodiment, a DBMS is configured to commit data to a database 210 by accessing a storage service 220. In certain embodiments a storage service 220 is, for example, Amazon® Simple Storage Service (S3). In an embodiment a storage service 220 utilizes an object storage. For example, the storage service 220 includes, in an embodiment, a plurality of buckets 230-1 through 230-M, individually referenced as storage bucket 230 (or bucket 230), generally referenced as storage buckets 230 (or buckets 230), where 'M' is an integer having a value of '2' or greater. In an embodiment, a bucket 230 is an object container. Data is written as objects to the object container, such that each object has a unique identifier of the object in the object container (i.e., bucket).

In certain embodiments, data is written by the DBMS utilizing the storage service 220 to a bucket 230-N. In some embodiments, the data is written in batches, each batch including a data object. For example, the bucket 230-N includes a plurality of data objects 240-1 through 240-M, individually referenced as data object 240, generally referenced as data objects 240, where 'M' is an integer having a value of '2' or greater. For example a first data object 240-1 may correspond to the data file 125 of FIG. 1 above.

In some embodiments, the production environment includes a service account 250. The service account 250 is a principal which is configured to access the production environment for inspection purposes, and receives instructions from the inspection environment, for example from the data detector 136. In an embodiment, a data detector 136 generates an instruction which, when executed by the service account 250, configures the service account 250 to access the storage service 220 and retrieve therefrom a data object 240. In some embodiments, the service account 250 is configured to send the data object to the inspection environment, for example to be accessed by the data detector 136, the classifier 132, and the like. In certain embodiments, the service account 250 is configured to receive an instruction from the data detector 136, which when executed configures the service account to access the data object and extract data, a data schema, metadata, combinations thereof, and the like, and send the extracted data, extracted data schema, extracted metadata, and the like to the inspection environment to be accessed, for example, by the data detector 136.

Figure 3:
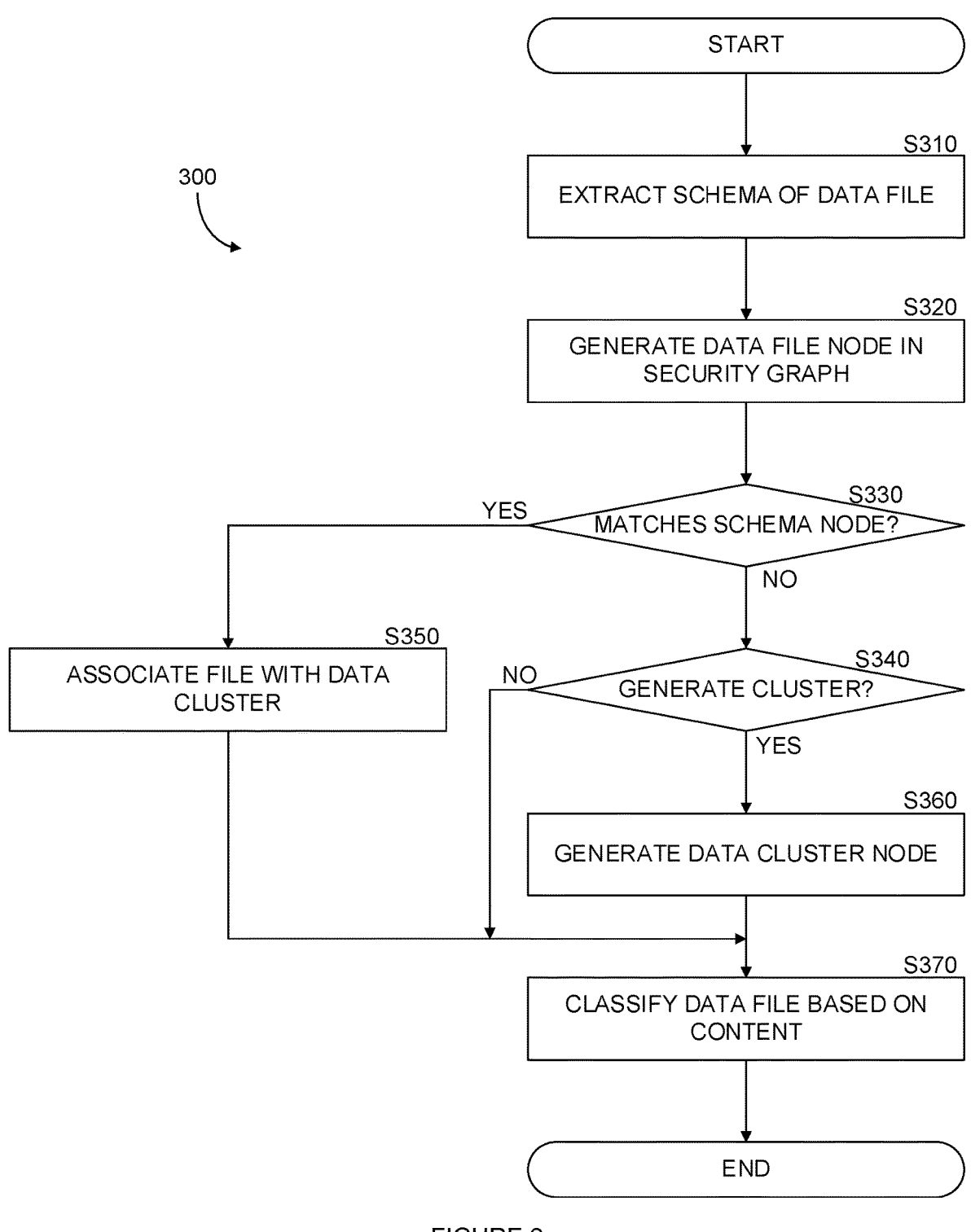
FIG. 3 is a flowchart of a method for clustering data objects on a security graph, implemented in accordance with an embodiment.

FIG. 3 is an example flowchart of a method for clustering data objects on a security graph, implemented in accordance with an embodiment. A data cluster represents a plurality of data objects, such as data files, which are all generated based on a single, same, schema.

At S310, a data schema of a data file is extracted. In an embodiment, extracting a data schema from a data file includes reading the data file and searching the data file for a header indicating the data schema. In an embodiment, a data schema includes a plurality of integrity constraints imposed on a database, or a file which stores a part of a database, in case of a distributed database. For example, in a relational database, a data schema includes, in an embodiment, a table name, a first column name, a first column data type, a second name, a second column data type, etc. In an embodiment, the data file is any one of: an Apache® Parquet file, an Apache ORC™ file, an Apache Avro™ file, and the like. For example, an Avro file includes a file header, which is followed by a plurality of data blocks. The file header includes metadata, which includes a data schema. A data schema in an Avro file is defined using JSON markup language. In an embodiment, the data fields of the JSON are read, and the values of the data fields extracted to identify the data schema.

In an embodiment, the data file is deployed in a cloud computing environment, such as production environment, a dev environment, a test environment, a staging environment, and the like. For example, the data file may be a data object stored in a bucket on an S3 service. The data file is generated, in an embodiment, by a database application, based on a data schema.

At S320, a data file node is generated in a security graph. In an embodiment, a data file node corresponds to the data file from which the data schema is extracted. In some embodiments, a data file node includes information about the data file, such as an identifier of the data file (e.g., file name), an identifier of a storage container from which the data file is extracted, an identifier of a workload on which the data file is stored, and the like. A storage container may be implemented, for example, utilizing Amazon® S3. A workload may be, for example, a virtual machine, a software container, a serverless function, and the like. For example, a data file may be detected on a disk associated with a virtual machine. Detection of the data file on a disk of the virtual machine may occur, for example, during inspection of the disk, for example for cybersecurity objects.

In an embodiment, the security graph includes a representation of a cloud environment in which the data file is deployed. For example, a virtual machine, software container, and serverless function may each be represented by a respective resource node in the security graph. An example of a security graph is discussed in more detail in FIG. 4 below.

At S330, a check is performed to determine if the extracted data schema matches a data schema stored on the security graph. If 'yes' execution continues at S350. If 'no', execution continues at S340. In an embodiment, the check is performed to determine if a node representing the data schema is already stored in the security graph. In some embodiments, a security graph is queried, for example based on data values extracted from a header of a data file indicating a data schema, to detect a node having the data values stored thereon.

At S340, a check is performed to determine if a data cluster node should be generated. If 'yes' execution continues at S360. If 'no' execution continues at S370. In an embodiment, a data file is associated with a data cluster node (also referred to as cluster node), for example by generating a node representing the data file, generating a node representing a data cluster, and connecting the node representing the data file to the data cluster node with an edge. Data files which are represented by nodes are indicated as being part of a single data structure, such as a distributed database, by connecting each such node to a data cluster node.

In some embodiments, data file nodes are connected to a cluster node of a single cloud computing environment. For example, a data file node representing a data file residing in a production environment and generated based on a first data schema is connected to a data cluster node of the production environment, while a data file node based on the first data schema but residing in a dev environment is connected to a data cluster node of the dev environment.

In certain embodiments, a data schema node is generated in the security graph to represent a data schema. In an embodiment, the schema node is generated based on the extracted data schema. In certain embodiments, the schema node includes metadata, such as an identifier of the schema, extracted values from data fields of the data schema, and the like. The data schema node may be connected by an edge, in an embodiment, to a data cluster node, a data file node, and the like.

At S350, the node representing the data file is associated with a node representing the data cluster. In an embodiment, associating the node representing the data file with a node representing the data cluster incudes generating an edge between the nodes and storing the edge in the security graph. By associating a plurality of data files with a node representing a data cluster, the data cluster may be displayed when rendering a visualization of sensitive data in a cloud computing environment. This reduces the amount of elements rendered, which is a reduction in processing and memory utilization.

At S360, a data cluster node is generated. In an embodiment, the data cluster node includes stored thereon metadata, such as a type of data. In some embodiments, the data cluster node is connected to a node which represents a storage in which a data file, represented by a node connected to the data cluster node, is stored. In an embodiment, the storage is a bucket. In certain embodiments a data schema node is generated for each generated data cluster node. In an embodiment, the schema node is generated based on the extracted data schema. In certain embodiments, the schema node includes metadata, such as an identifier of the schema, extracted values from data fields of the data schema, and the like.

At S370, the data file is classified. In an embodiment, the data file is classified based on the content of the data file. In some embodiments, classification of data is performed by reading the content of the data file and providing the content to a data classifier. In certain embodiments, classifying the data file includes generating an instruction which when executed provides a data classifier access to the data file, content of the data file, metadata of the data file, the data schema, a combination thereof, and the like.

In an embodiment, the data file is classified to sensitive data or non-sensitive data. In some embodiments, sensitive data is classified into PII, PHI, PCI, a combination thereof, and the like. In certain embodiments classifying the data file includes performing classification techniques, performed individually or in combination, such as linear classification, quadratic classification, decision trees, neural networks, machine learning, and the like. In some embodiments, natural language processing (NLP) techniques, such as Word2Vec, are performed on the data. This may be beneficial to determine a distance between, for example, a column name (such as "ccard") and a predefined term (such as "credit card"), where the predefined term is associated with a data type.

For example, in an embodiment, the data file is read, metadata stored in the data file is read, and a data schema stored in the data file is read. Data classification, NLP, a combination thereof, and the like, is then performed on any one of the read: data, metadata, and data schema.

Figure 4:
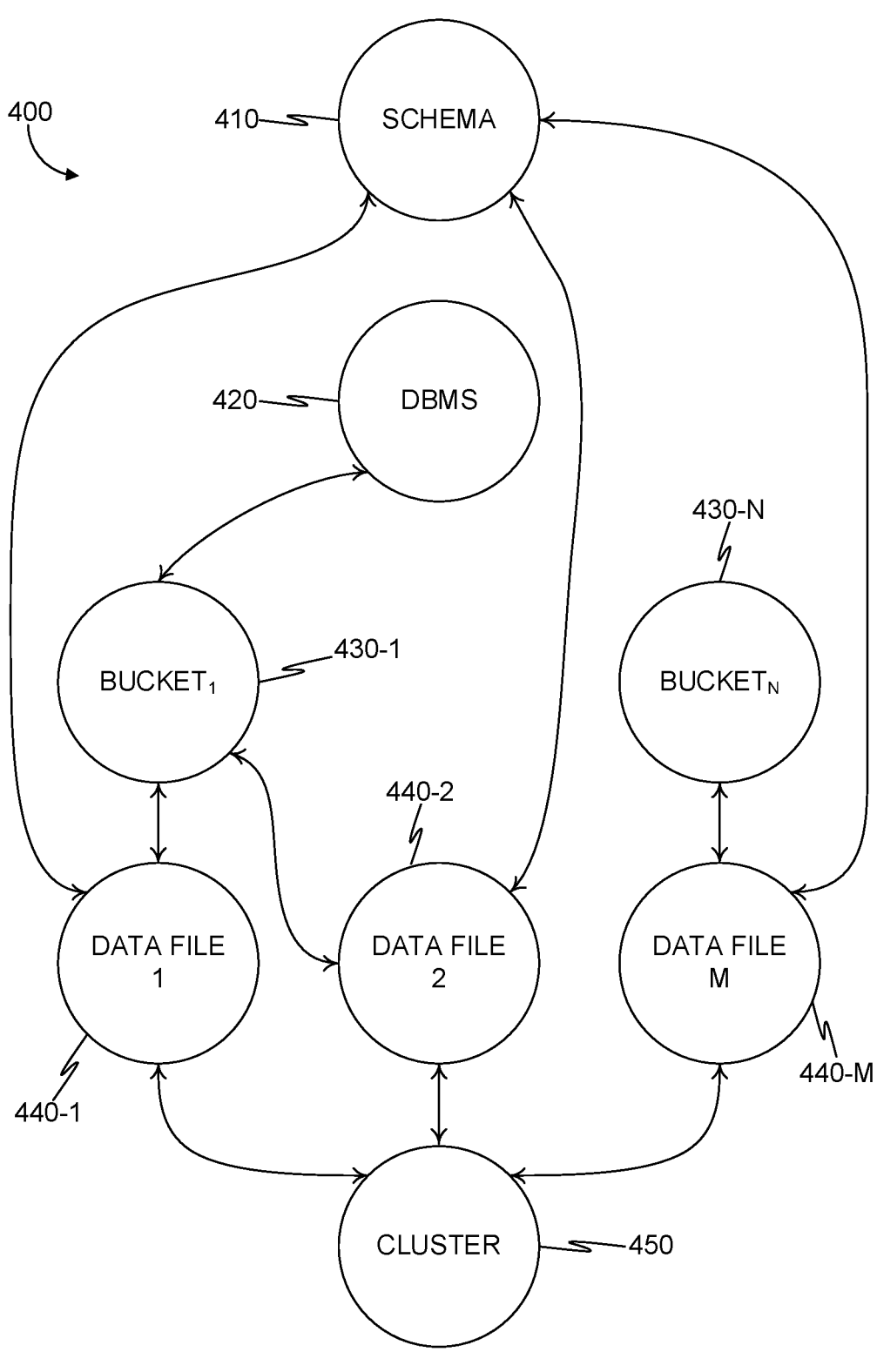
FIG. 4 is a graph diagram of a security graph representing a portion of a cloud computing environment, implemented in accordance with an embodiment.

FIG. 4 is an example graph diagram 400 of a security graph representing a portion of a cloud computing environment, implemented in accordance with an embodiment. A data schema node 410 is connected to a first data file node 440-1, a second data file node 440-2 and a third data file node 440-M. Each data file node 440-1 through 440-M, where 'M' is an integer having a value of '3' or greater, represents a data file which shares a schema, the schema represented by the data schema node 410.

Each data file node 440-1 through 440-M is connected to a bucket node 430-1 through 430-N, where 'N' is an integer having a value of '2' or greater, each bucket node representing a bucket in a cloud computing environment. In an embodiment, the first bucket represented by the first bucket node 430-1 is deployed in a first cloud computing environment and the second bucket, represented by the second bucket node 430-N, is deployed in a second cloud computing environment, which is different from the first cloud computing environment. For example, the first cloud computing environment may be deployed on AWS, while the second cloud computing environment is deployed on GCP.

The first bucket node 430-1 is connected to the first data file node 440-1 and the second data file node 440-2. The second bucket node 430-N is connected to the third data file node 440-M. In an embodiment, a DBMS application, such as deployed on database 210 of FIG. 2 writes data files to the first bucket. The DBMS application is represented by a DBMS node 420.

In an embodiment, the first data file node 440-1, the second data file node 440-2 and the third data file node 440-M are each connected to a data cluster node 450. In certain embodiments, the third data file node 440-M is not connected to the cluster node 450, in response to determining that the third data file is deployed in a cloud computing environment which is not the cloud computing environment in which the first data file and the second data file are deployed.

In certain embodiments, a security graph 400 is queried to detect sensitive data nodes. For example, a query may be executed on a graph database, such as Neo4j®, in which a security graph 400 is stored. The query, when executed, returns as an output nodes which include metadata indicating that the node represents a sensitive data element. For example, a classifier may determine that the first data file represented by the first data file node 440-1 includes sensitive data. The first data file node 440-1 is updated with a value, for example stored as metadata, to indicate that the first data file represented by the first data file node 440-1 includes sensitive data.

In some embodiments, the security graph 400 is further traversed, to determine if a data file node is connected to a cluster node. If the data file node is connected to a data cluster node, such as data cluster node 450, the data cluster node 450 may be provided as an output to the query, in lieu of providing the first data file node 440-1, the second data file node 440-2, and the third data file node 440-M, each of which include thereon sensitive data, as indicated, for example, by a metadata value stored thereon.

Figure 5:
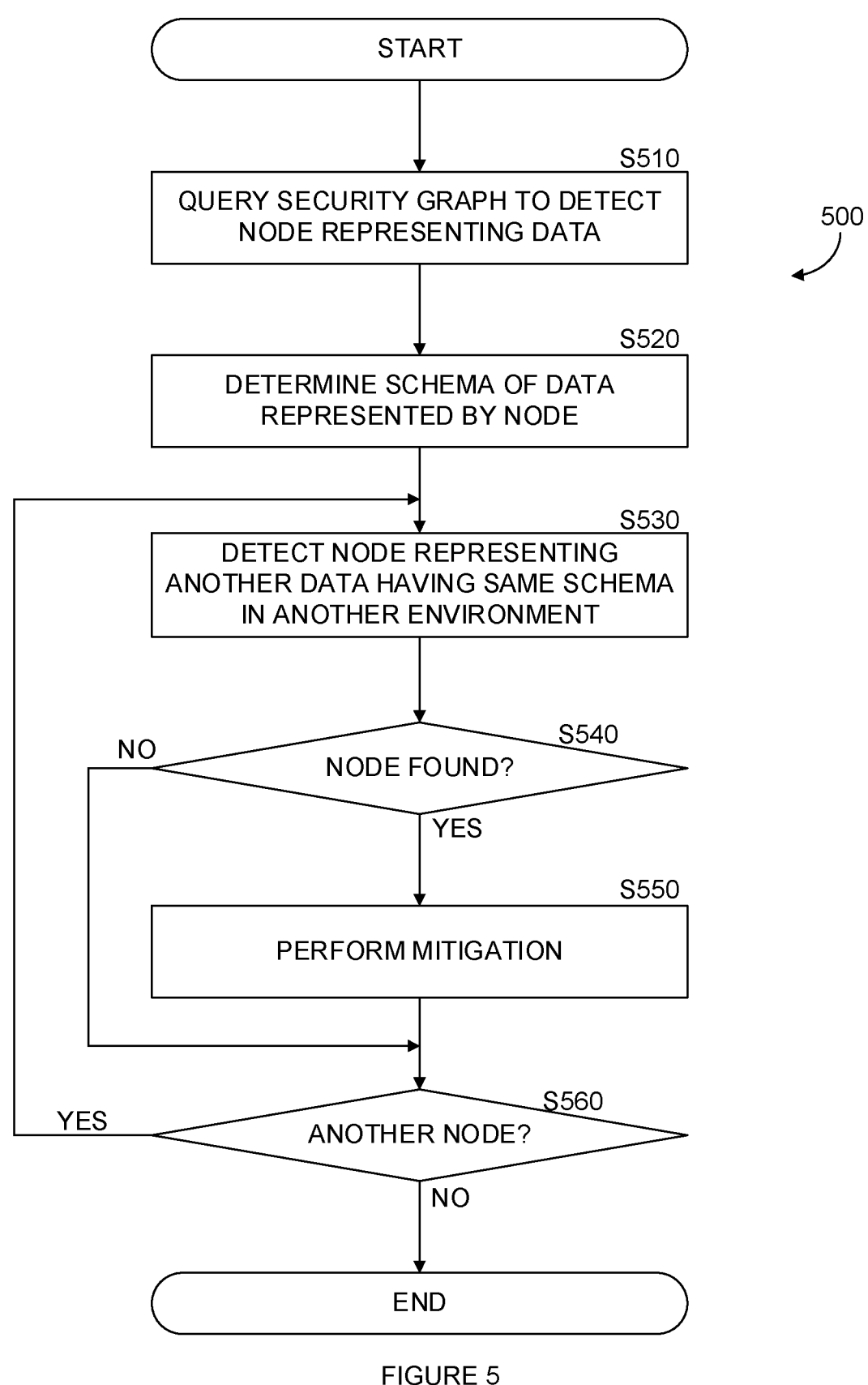
FIG. 5 is a flowchart for mitigating a cybersecurity risk caused by sensitive data detected in an unsecure location, implemented in accordance with an embodiment.

FIG. 5 is an example of a flowchart 500 for mitigating a cybersecurity risk caused by sensitive data detected in an unsecure location, implemented in accordance with an embodiment.

At S510, a security graph is queried to detect a node representing a data file. In an embodiment, each node in the security graph includes a metadata value which indicates a type of cloud entity, enrichment, network element, and the like, which is represented by the node. For example, a value indicating a type may be, in an embodiment, a resource, a principal, an enrichment, a virtual machine, a software container, a serverless function, an application, a database, a data file, a data file type, and the like. In an embodiment, the query, when executed on a graph database having stored therein a security graph, returns an output which includes a node identifier which represents a data file. In certain embodiments, the security graph includes a representation of a cloud computing environment, including a storage, such as a storage service, a database, and the like.

In some embodiments, the security graph is queried to detect a node which represents a data file having sensitive data. For example, a data file node includes, in an embodiment, a metadata value indicating that the data file includes sensitive data. In certain embodiments, the metadata values indicate any one of: PII, PCI, PHI, a combination thereof, and the like.

At S520, a data schema of the detected node is determined. In an embodiment, the security graph may be traversed to determine if the data file node is connected to a data schema node, such as illustrated in the example of FIG. 4 above. A data file node connected to a data schema node indicates that the data file represented by the data file node is generated based on a data schema represented by the data schema node.

At S530, a node representing another data file having the same data schema is detected in another computing environment. Two (or more) data files can share a single data schema, for example, if the second data file is a copy of the first data file, or if the first data file and the second data file are part of a distributed database. For example, a first data file is deployed in a first cloud computing environment, such as a production environment, while a second data file, which is a copy of the first data file, is deployed in a second cloud computing environment, such as a dev environment.

In an embodiment, detecting a node representing another data file includes traversing the security graph to detect a second data file node connected to the data schema node, and determining that the second data file represents a second data file which is deployed in a cloud computing environment which is not the cloud computing environment in which the first data file is deployed. For example, the security graph may be traversed to detect that the second data file node is connected to a bucket node representing a bucket, which is in a different cloud computing environment than a bucket in which the first data file is stored. For example, the bucket node includes, in an embodiment, metadata which indicates an identifier of the a cloud computing environment in which the bucket represented by the bucket node is deployed.

At S540, a check is performed to determine if a node representing another data is found. If 'yes' execution continues at S550, if 'no' execution continues at S560.

At S550, a mitigation action is performed. In some embodiments, a mitigation action includes generating an instruction, which when executed generates an alert to indicate that a file having sensitive data is detected in a computing environment in which the file is not supposed to be. In some embodiments, a mitigation action includes generating an instruction which, when executed, configures the cloud computing environment to remove the another data file, for example by deleting the file.

At S560, a check is performed to determine if the security graph should be traversed to detect another node connected to the data schema. If 'yes', execution continues at S530, otherwise execution terminates.

Figure 6:
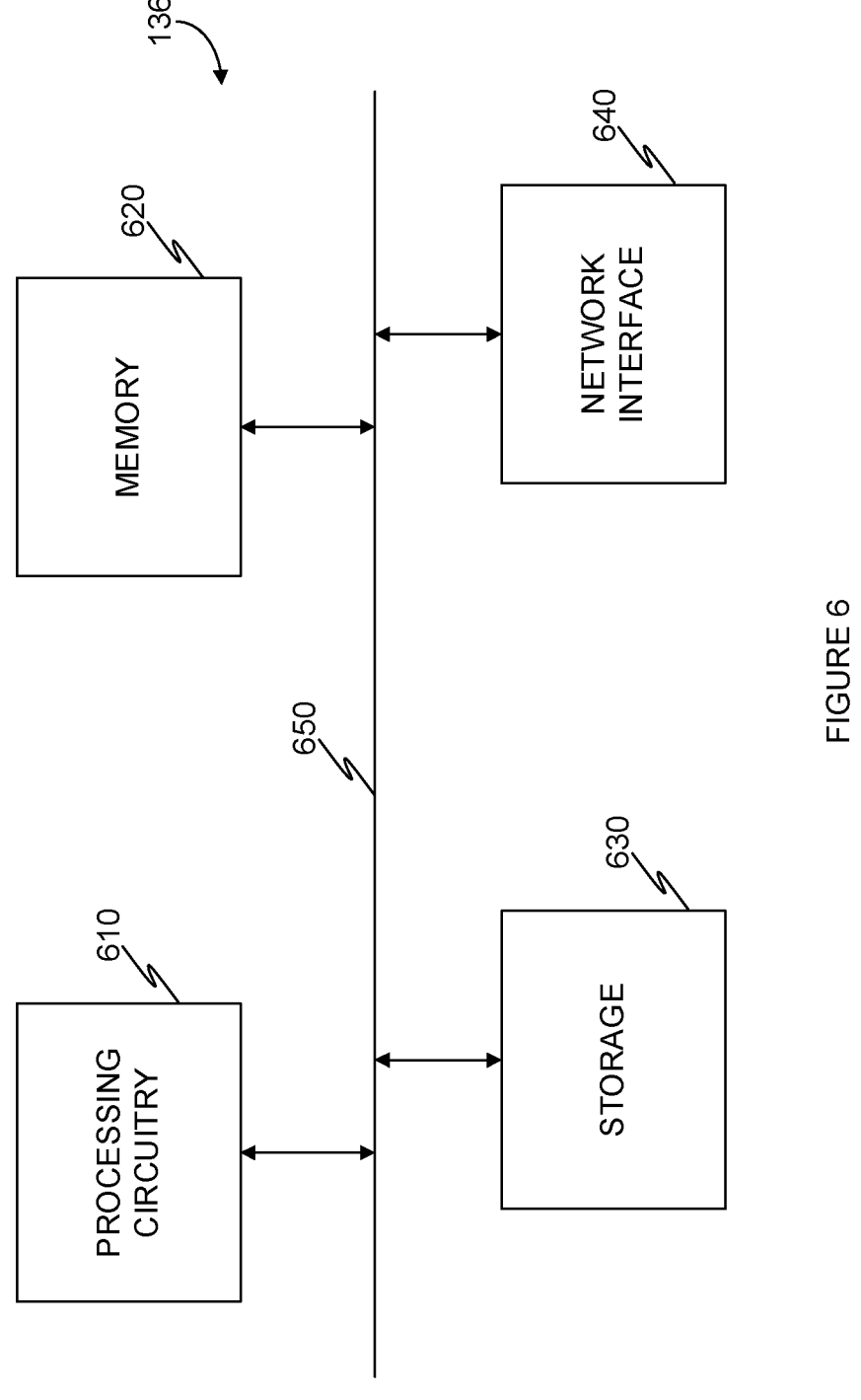
FIG. 6 is a schematic diagram of a data detector according to an embodiment.

FIG. 6 is an example schematic diagram of a data detector 136 according to an embodiment. The data detector 136 includes a processing circuitry 610 coupled to a memory 620, a storage 630, and a network interface 640. In an embodiment, the components of the data detector 136 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the data detector 136 to communicate with, for example, the classifier 132, the graph database 134, the production environment 110, the dev environment 120, and the like.

It should be understood that the embodiments described herein are not limited to the specific architecture illustrated in FIG. 6, and other architectures may be equally used without departing from the scope of the disclosed embodiments.

Furthermore, in certain embodiments the classifier 132, graph database 134, and the like, may be implemented with the architecture illustrated in FIG. 6. In other embodiments, other architectures may be equally used without departing from the scope of the disclosed embodiments.

Figure 7:
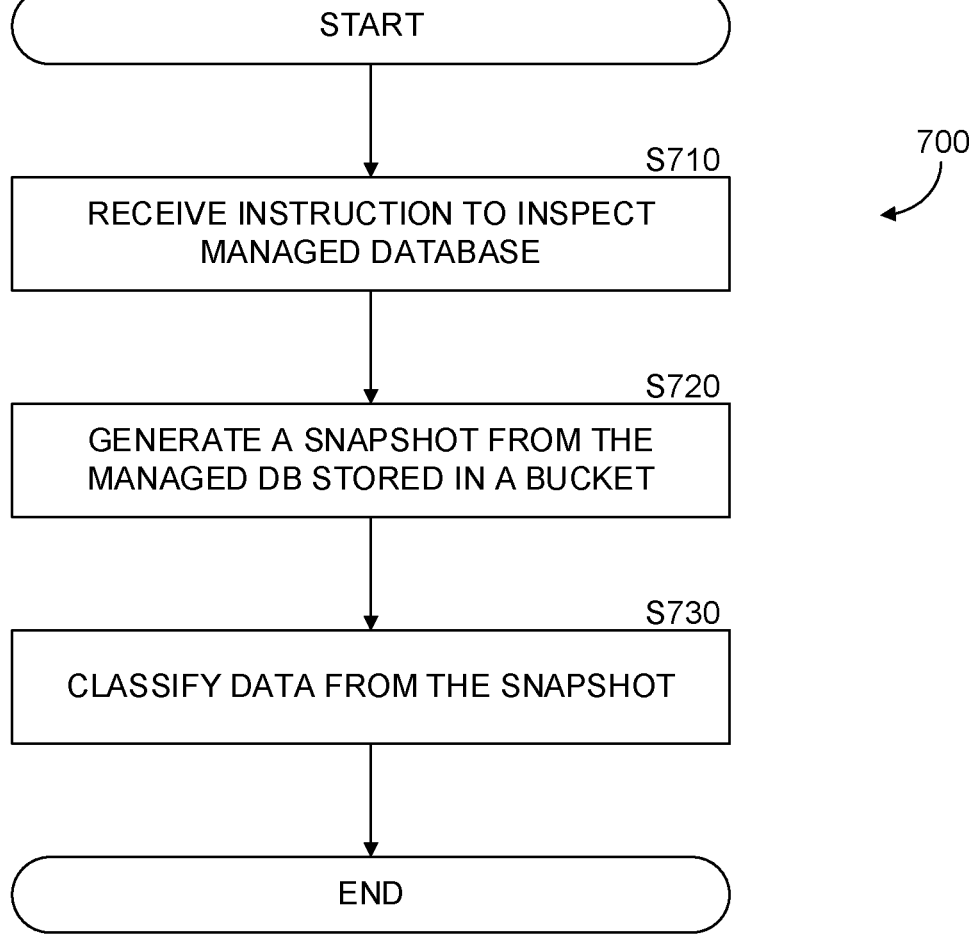
FIG. 7 is a flowchart of a method for detecting sensitive data in a managed database, implemented in accordance with an embodiment.

FIG. 7 is an example of a flowchart 700 of a method for detecting sensitive data in a managed database, implemented in accordance with an embodiment. A managed database is a cloud computing service provided by a cloud computing platform, such as Oracle® Cloud Infrastructure (OCI). For example, a managed database deployed on OCI is Oracle® Autonomous Database.

At S710, an instruction is received to inspect a managed database for sensitive data. In an embodiment, an inspection environment determines that a workload, for example deployed in a production environment, is configured to write data to a managed database. For example, this may be determined by configuring a data detector to read network logs of the production environment, which include data access events, indicating that a workload, such as a virtual machine, accessed a managed database service.

In some embodiments, the instruction includes access credentials which, when applied to a managed database service, allow a data detector to access files, objects, data, and the like, which is stored on the managed database service. In some embodiments, the managed database service stores data according to a predefined data schema.

At S720, a snapshot is generated from the managed database. In certain embodiments, the received instruction of S710 includes an identifier of a data schema, data file, and the like, based on which the managed database is configured to generated the snapshot. In some embodiments, generating a snapshot includes generating an instruction which, when executed by a managed database system, configures the managed database system to generate the snapshot and provide access to the snapshot to a predetermined principal, such as a service account associated with an inspection environment. For example, the generated snapshot is stored in a bucket and access is provided to the bucket for the predetermined principal, in an embodiment.

In some embodiments, the generated snapshot, when stored in a bucket, is stored as data files, for example as Apache Parquet files, as Apache ORC files, as Apache Avro files, and the like. In certain embodiments each data file is generated to have a predetermined size. Each data file includes a header and a content. In an embodiment, the header includes a data schema.

At S730, data from the snapshot is classified. In an embodiment various classification techniques are utilized, individually or in combination, such as linear classifiers, quadratic classifiers, decision trees, neural networks, machine learning, and the like, to classify data from the snapshot. In some embodiments, natural language processing (NLP) techniques are performed on the data, such as Word2Vec. This may be beneficial to determine a distance between, for example, a column name (such as "ccard") and a predefined term (such as "credit card"), where the predefined term is associated with a data type, such as sensitive data, non-sensitive data, PII, PCI, PHI, and the like.

In an embodiment, a data file is read from a bucket where the snapshot is stored, and metadata stored in the data file, a data schema stored in the data file are extracted. In certain embodiments classification, NLP, a combination thereof, and the like, are performed on any one of: the data content, the metadata, and the data schema. For example, NLP may be performed on a data value, to ascertain if the data value matches another data value, which is predetermined as a class of data, such as PII (personal identifiable information—sensitive data).

Classifying data utilizing the method disclosed above is beneficial, as a single data file can be enough to classify an entire database. Therefore, there is no need to read, copy, or otherwise perform computer processing, on an entire database, but rather only on a part of the database stored as a data file, in order to classify the data which is stored thereon. For example, a database may have a total size of 100 TB, but in practice is stored as data files having a size of up to 100 GB each. By only inspecting one such data file, there is no need to process, or store in memory, the total size of the database, thereby reducing by three orders of magnitude the amount of processing and memory utilization required to otherwise perform classification of the data.

Figure 8:
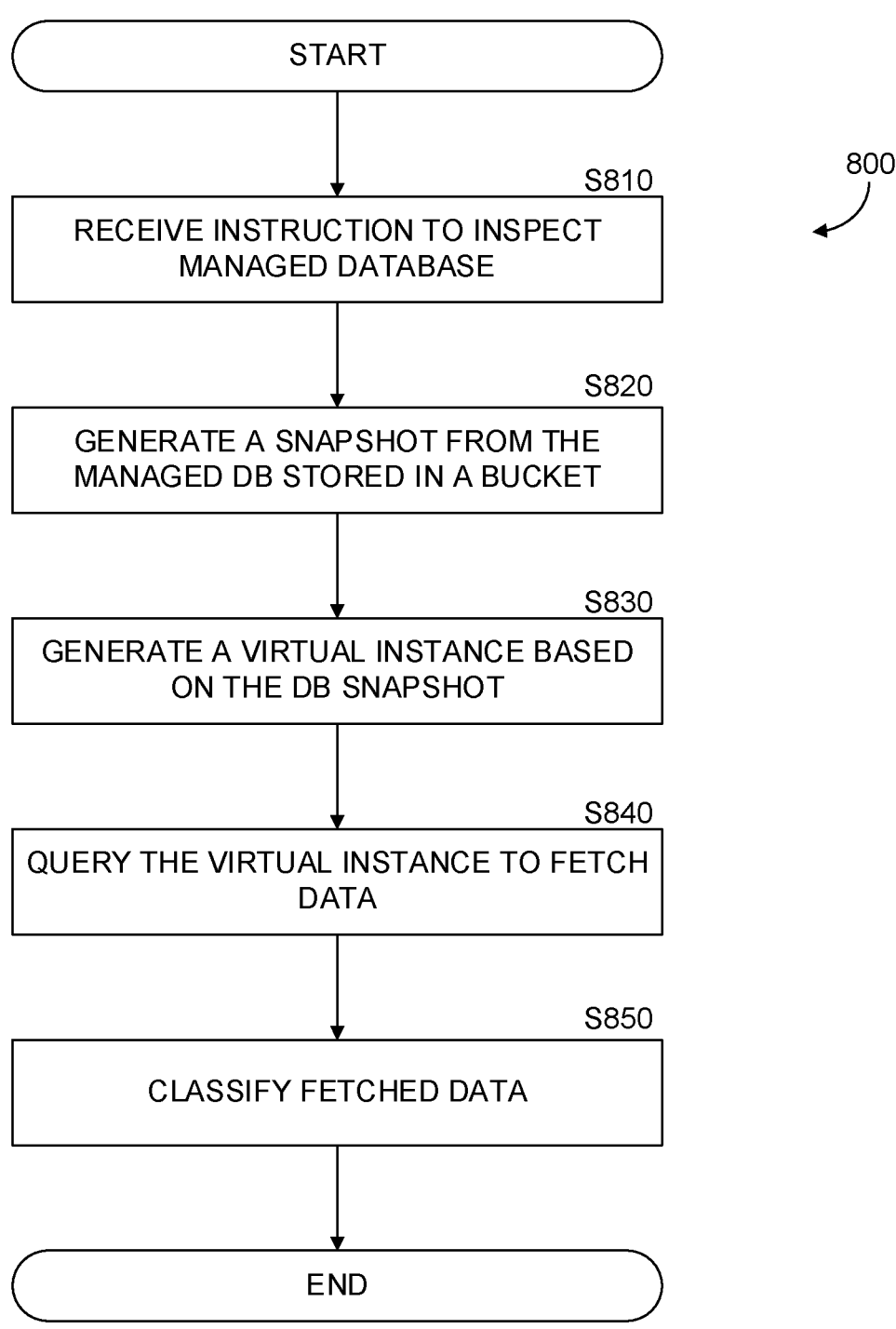
FIG. 8 is a flowchart of a method for detecting sensitive data in a managed database, implemented in accordance with another embodiment.

FIG. 8 is an example of a flowchart 800 of a method for detecting sensitive data in a managed database, implemented in accordance with another embodiment. A managed database is a cloud computing service provided by a cloud computing platform, such as Oracle® Cloud Infrastructure (OCI). For example, a managed database deployed on OCI is Oracle® Autonomous Database.

At S810, an instruction is received to inspect a managed database for sensitive data. In an embodiment, an inspection environment determines that a workload, for example deployed in a production environment, is configured to write data to a managed database. For example, this may be determined by configuring a data detector to read network logs of the production environment, which include data access events, indicating that a workload, such as a virtual machine, accessed a managed database service.

In some embodiments, the instruction includes access credentials which, when applied to a managed database service, allow a data detector to access files, objects, data, and the like, which is stored on the managed database service. In some embodiments, the managed database service stores data according to a predefined data schema.

At S820, a snapshot is generated from the managed database. In certain embodiments, the received instruction of S810 includes an identifier of a data, a data schema, data file, and the like, based on which the managed database is configured to generated the snapshot. In some embodiments, generating a snapshot includes generating an instruction which, when executed by a managed database system, configures the managed database system to generate the snapshot and store it in a bucket accessible by a predetermined principal, such as a service account associated with an inspection environment.

In some embodiments, the generated snapshot, when stored in a bucket, is stored as data files, for example as Apache Parquet files, as Apache ORC files, as Apache Avro files, and the like. In certain embodiments each data file is generated to have a predetermined size. Each data file includes a header and a content. In an embodiment, the header includes a data schema.

At S830, a virtual instance is deployed based on the snapshot. A virtual instance may be, for example, an instance of the database type of the managed database system, deployed on a virtual machine. For example, the managed database system may be of a MySQL type. The generated virtual instance is, in an embodiment, a virtual machine deploying a MySQL application, and includes the data stored in the managed database system. For example, in OCI a virtual machine is generated, in an embodiment, utilizing Oracle® VirtualBox®. In certain embodiments, generating the virtual instance further includes providing a service account, for example which is accessible to an inspection environment, with credentials to access the virtual instance. The service account may be utilized, for example by a data detector, to detect sensitive data. In an embodiment, the virtual instance is deployed in the cloud environment, in an inspection environment, and the like.

At S840, the virtual instance is queried to fetch data. In an embodiment, querying the virtual instance includes generating a query directed at a database management system which is deployed on the virtual instance. For example, a SELECT query may be generated and directed at the MySQL application to fetch data, which is received as a result from the query. In some embodiments, the database may be queried multiple times to generate multiple results, each of which may be classified. For example, a first query may be generated and directed at a first column of a database, a second query may be generated which is directed at a second column of the database, etc. In an embodiment, a graph database is queried to fetch data objects, such as nodes and edges, for classification.

At S850, the fetched data is classified. In an embodiment various classification techniques are utilized, individually or in combination, such as linear classifiers, quadratic classifiers, decision trees, neural networks, machine learning, and the like, to classify the fetched data. In some embodiments, natural language processing (NLP) techniques are performed on the data, such as Word2Vec. This may be beneficial to determine a distance between, for example, a column name (such as "ccard") and a predefined term (such as "credit card"), where the predefined term is associated with a data type, such as sensitive data, non-sensitive data, PII, PCI, PHI, and the like.

In an embodiment, metadata and a data schema may be fetched from the virtual instance. In certain embodiments classification, NLP, a combination thereof, and the like, are performed on any one of: the fetched data, fetched metadata, fetched data schema, a combination thereof, and the like. For example, NLP may be performed on a data value, to ascertain if the data value matches another data value, which is predetermined as a class of data, such as PII (personal identifiable information—sensitive data).

Generating a database instance from a snapshot of a managed database is beneficial as it allows an inspection environment to perform as many queries as required in order to classify data. This is advantageous as in distributed databases, similar values are often stored together in a file, which allows greater compression of the file. However, if the data stored in the file is similar (or identical), classification may not be possible. For example, if a data column of a data file of a distributed database contains only the values "JR", it is difficult to classify whether these are a person's initials, a suffix, or none of these. However, by querying the column, for example to randomly select values from different rows, classification may be improved based on the results of the queries. For example, if the query results are "JR", "JR", "SR", ESQ", etc., then the probability is high that this column represents a suffix. It is therefore advantageous to be able to query the database to be able to properly classify the data stored therein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for agentless detection of sensitive data in a cloud computing environment and rendering the same for display, comprising:
generating a snapshot from a managed database service of a cloud computing environment, the snapshot including a plurality of data files;

deploying a virtual instance based on the snapshot to generate a database, the database including a database management system (DBMS);
querying the DBMS to fetch data from the database;
classifying the fetched data, wherein the fetched data is classified as sensitive data or non-sensitive data; and
generating a node on a security graph stored in a graph database to represent the fetched data and the classification thereof, wherein the security graph includes a representation of the cloud computing environment.

2. The method of claim 1, further comprising:
detecting that a workload deployed in the cloud computing environment stores data in the managed database service.

3. The method of claim 1, further comprising:
receiving access credentials for the managed database service, the access credentials providing access to the plurality of data files.

4. The method of claim 3, further comprising:
receiving any one of: an identifier of data stored on the managed database service, an identifier of a data schema stored on the managed database service, an identifier of a data file stored on the managed database service, and any combination thereof.

5. The method of claim 1, further comprising:
storing the plurality of data files in a bucket which is accessible by an inspection environment.

6. The method of claim 1, wherein the virtual instance is any one of: a virtual machine, and a software container.

7. The method of claim 1, further comprising:
fetching from the DBMS any one of: a data schema, and a metadata; and
classifying the fetched data further based on any one of: the data schema, the fetched data, the metadata, and any combination thereof.

8. The method of claim 1, further comprising classifying sensitive data further as any one of: personal identifiable information (PII), personal health information (PHI), payment card industry (PCI), and any combination thereof.

9. The method of claim 1, wherein of the plurality of data files includes a header and a content and the header includes a data schema.

10. A non-transitory computer readable medium having stored thereon instructions for causing a processing circuitry to execute a process, the process comprising:
generating a snapshot from a managed database service of a cloud computing environment, the snapshot including a plurality of data files;
deploying a virtual instance based on the snapshot to generate a database, the database including a database management system (DBMS);
querying the DBMS to fetch data from the database;
classifying the fetched data, wherein the fetched data is classified as sensitive data or non-sensitive data; and
generating a node on a security graph stored in a graph database to represent the fetched data and the classification thereof, wherein the security graph includes a representation of the cloud computing environment.

11. The non-transitory computer readable medium of claim 10, wherein of the plurality of data files includes a header and a content and the header includes a data schema.

12. A system for agentless detection of sensitive data in a cloud computing environment and rendering the same for display, comprising:
a processing circuitry; and a memory, the memory containing instructions that, when executed by the processing circuitry, configure the system to:

generate a snapshot from a managed database service of a cloud computing environment, the snapshot including a plurality of data files;

deploy a virtual instance based on the snapshot to generate a database, the database including a database management system (DBMS);

query the DBMS to fetch data from the database;

classify the fetched data, wherein the fetched data is classified as sensitive data or non-sensitive data; and generate a node on a security graph stored in a graph database to represent the fetched data and the classification thereof, wherein the security graph includes a representation of the cloud computing environment.

13. The system of claim 12, wherein the system is further configured to:

detect that a workload deployed in the cloud computing environment stores data in the managed database service.

14. The system of claim 12, wherein the system is further configured to:

receive access credentials for the managed database service, the access credentials providing access to the plurality of data files.

15. The system of claim 14, wherein the system is further configured to:

receive any one of: an identifier of data stored on the managed database service, an identifier of a data schema stored on the managed database service, an identifier of a data file stored on the managed database service, and any combination thereof.

16. The system of claim 12, wherein the system is further configured to:

store the plurality of data files in a bucket which is accessible by an inspection environment.

17. The system of claim 12, wherein the virtual instance is any one of: a virtual machine, and a software container.

18. The system of claim 12, wherein the system is further configured to:

fetch from the DBMS any one of: a data schema, and a metadata; and classifying the fetched data further based on any one of: the data schema, the fetched data, the metadata, and any combination thereof.

19. The system of claim 12, wherein the system is further configured to:

classify sensitive data further as any one of: personal identifiable information (PII), personal health information (PHI), payment card industry (PCI), and any combination thereof.

20. The system of claim 12, wherein of the plurality of data files includes a header and a content and the header includes a data schema.

*    *    *    *    *